United States Patent [19]
Becker et al.

[11] 3,868,913
[45] Mar. 4, 1975

[54] HOPPER VEHICLE

[75] Inventors: Peter W. Becker, Struthers; Albert E. Price, Brookfield; Erling Mowatt-Larssen, Warren; Carl E. Becker, Masury, all of Ohio

[73] Assignee: General American Transportation Corporation, Chicago, Ill.

[22] Filed: Feb. 19, 1974

[21] Appl. No.: 443,217

[52] U.S. Cl................. 105/240, 105/251, 105/284, 105/308 P
[51] Int. Cl............................................. B61d 7/02
[58] Field of Search ........... 105/240, 248, 250, 251, 105/255, 284, 288, 304, 308 E, 308 P

[56] References Cited
UNITED STATES PATENTS

| | | | |
|---|---|---|---|
| 3,515,076 | 6/1970 | Aquino | 105/304 X |
| 3,540,382 | 11/1970 | Dorey | 105/240 |
| 3,596,608 | 8/1971 | Aquino et al. | 105/240 X |
| 3,605,634 | 9/1971 | Johnson | 105/248 |

*Primary Examiner*—M. Henson Wood, Jr.
*Assistant Examiner*—John J. Love
*Attorney, Agent, or Firm*—Claron N. White

[57] ABSTRACT

A novel hopper vehicle, illustratively a freight hopper car, has a floor with two longitudinal hoppers and a pair of side-opening doors on opposite sides of the center line of the vehicle. Each door provides a part of one of the hoppers and is pivotally mounted on a side sill of the vehicle. Preferably each door is a wrap-around door to provide also a lower part of a side of the body of the vehicle and its pivotal mounting is on an intermediate side sill that extends between the sloping end walls of the body of the vehicle at an intermediate elevation. The body of the vehicle has fixed side walls. In the construction with wrap-around doors the fixed side walls form only a part of the sides of the body. Each of the two opposed doors is connected to a novel door-operating, power-operated mechanism that functions also, as soon as the door is closed, to provide a positive locking, preferably a three-point locking, of the door. The maintenance of the condition of the power-operated part of the mechanism is not required to retain the door in the locked condition. As a freight car, the body structure of the vehicle has a novel construction. For each side there are two lower stub side sills, each of which is located at a truck of the car. The end portions of the intermediate side sills are spaced above and overlie the lower stub side sills. A shear panel is connected to each stub side sill and to the overlying end portion of an intermediate side sill. A shear panel is connected also to each overlying end portion of the intermediate side sill and to the top chord of the body of the car. For the central portion of the floor of the car body there is a longitudinally-extending, inverted V-shaped panel that is mounted above the intermediate portion of the center sill of the car and that provides by its sloping walls the other part of the hoppers.

32 Claims, 11 Drawing Figures

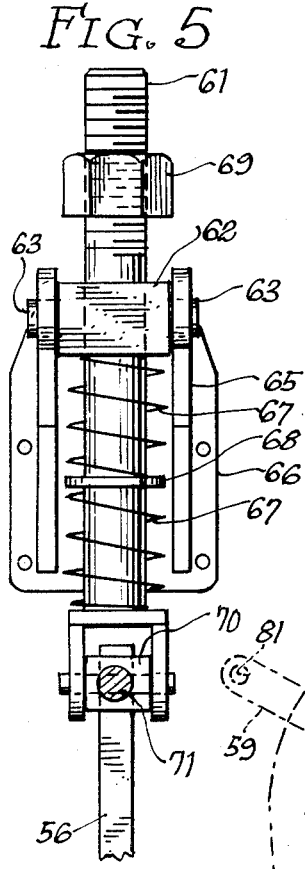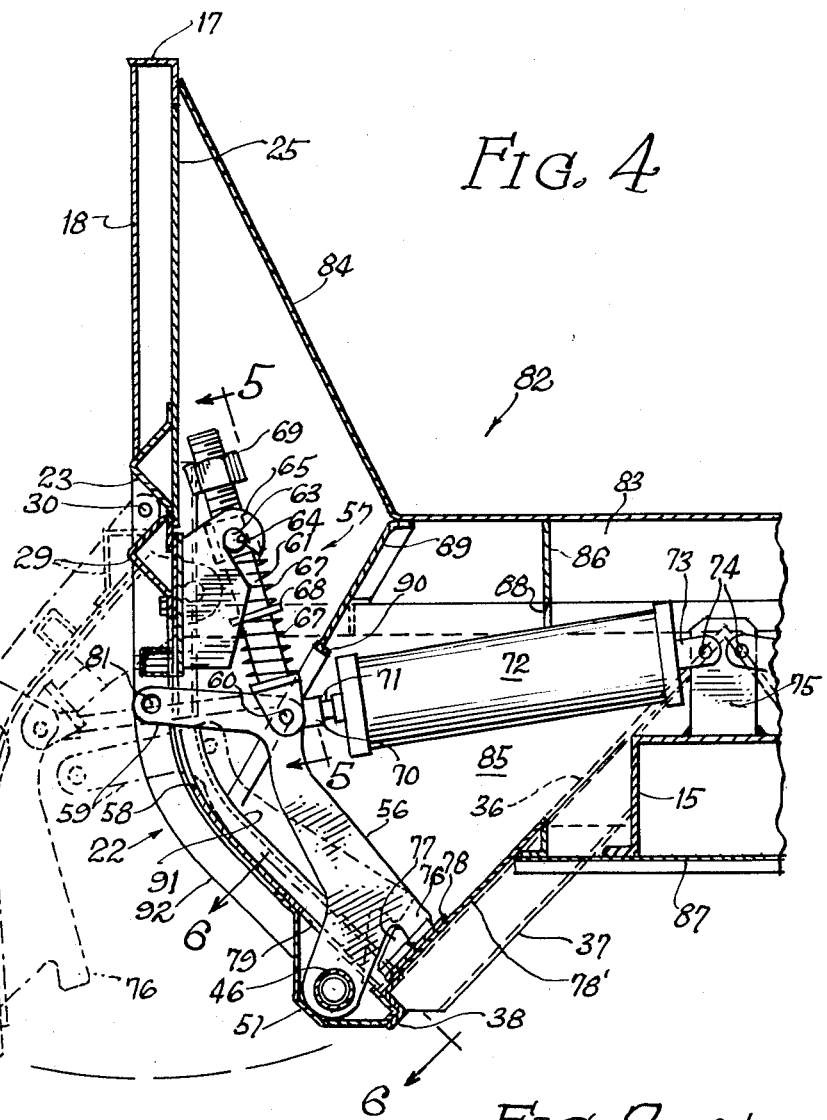

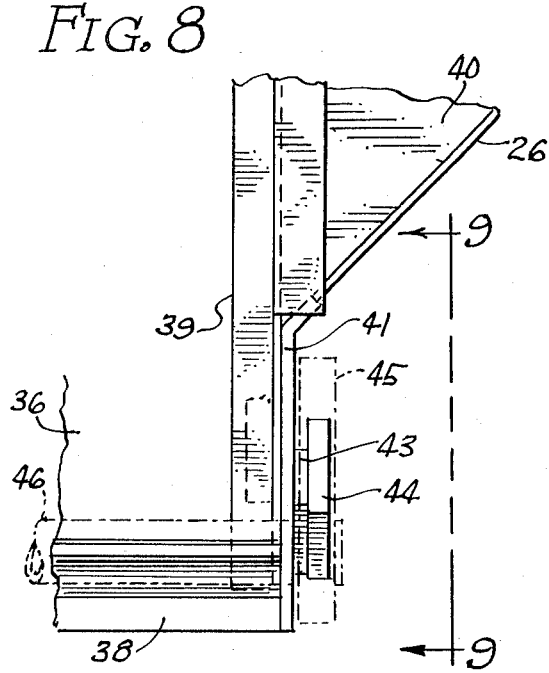
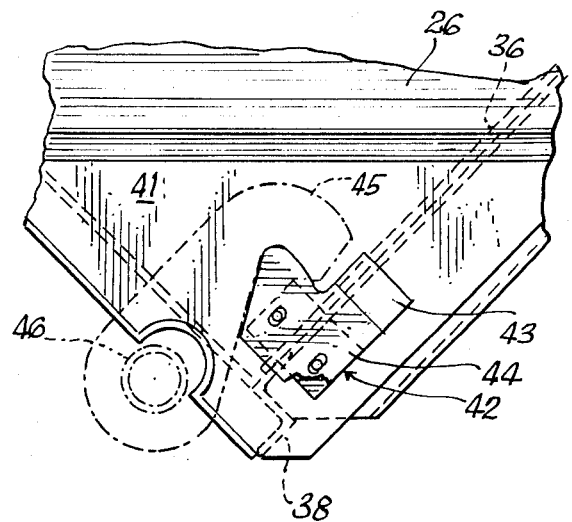
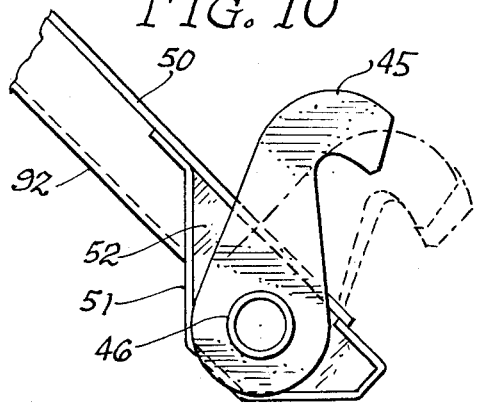
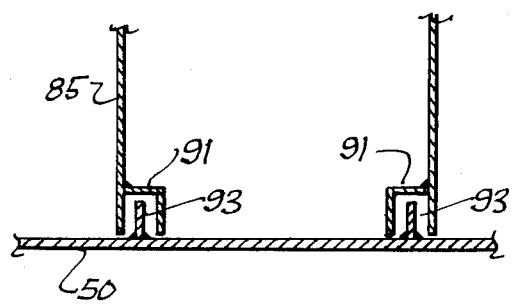

HOPPER VEHICLE

BACKGROUND OF THE INVENTION

1. Field of the Invention

This invention relates to a bottom-opening hopper vehicle, especially a freight hopper car. The invention relates in part to a side-opening, wrap-around hopper door construction and its mounting, as well as door-operating, power-operated mechanisms for moving hopper doors between open and closed positions. The invention further relates to a body structure for a hopper freight car having a side-opening doors in which the construction is such to provide for transfer of vertical forces and longitudinal forces due to buff and draft loads.

2. Description of the Prior Art

Freight hopper cars are described generally and classified on page 176 of the 1970 edition of *Car Locomotive Cyclopedia of American Practice* published by Simmons-Broadman Publishing Corp., New York, N.Y. Freight hopper cars are used to transport many type of materials including, but not limited to, coal and the various materials expressly mentioned on page 176 of the book mentioned above. Some hopper cars are of the type in which the doors are hinged lengthwise of the car while others have doors of the hoppers that are hinged crosswise. The pertinent prior art relates to constructions in which the hoppers have doors hinged lengthwise of the car.

The pertinent type of hopper car is generally a car with sides, sloping end sheets and a pair of doors that, when closed, provide at least a part of one or more hoppers and, when open, will permit discharge by gravity of the entire load of material. In some constructions the two doors, when closed, abut each other so that there is one hopper extending lengthwise of the car. In such construction attached to the bottom portion of the fixed vertical side is a panel that slopes down inwardly towards the central line of the car. The associated door, that is pivotally mounted to the side sill, extends downwardly and toward the other door that it abuts when both doors are closed. In a further construction the two doors are pivotally mounted adjacent the center sill above which there is a longitudinal inverted V-shaped panel forming part of the floor of the car. In this construction the distal end portion of each door abuts the bottom of a side of the car when the door is closed. Illustrative constructions of the various types mentioned above are disclosed in U.S. Pat. Nos. 1,028,882, 1,685,089 and 3,717,109.

A conventional freight of railway hopper car has, as described in U.S. Pat. No. 3,717,109, side panels, inwardly sloping end sheets, side sills and top chords, that are also called upper sills. The side panels are connected to the side sills and the upper sills. There are also conventional side stakes or side posts that are connected to each side sill and the corresponding upper sill. The type of hopper car shown in that patent is of the "sill-less type" that includes at its ends stub center sills suitably provided with bolster structures to which conventional car trucks are connected. In another type of hopper car the center sill extends the full length of the car and its end portions are suitably provided with the bolster structures.

In the car of the construction of U.S. Pat. No. 3,717,109 the side sills are located, as is conventional, just above the horizontal plane at which the top of the center sill is located. In the construction shown in that patent, the pair of hopper doors are pivotally mounted on brackets mounted on the side sills. The pivotal axis of each door is at the elevation of the side sill that extends the full length of the car. This construction requires the presence of a slope sheet that extends inwardly from the bottom portion of the side wall to provide a part of the generally sloping surface for the floor. The rest of the floor is provided by the pair of doors. In the construction each door has an articulated construction.

As seen later in the detailed description of the present invention, the body construction of the car of the present invention is different. It has a center sill that extends basically the full length of the car and each side sill is in three parts, viz., an upper intermediate side sill and two lower stub side sills. The stub side sills are located at the conventional elevation to be connected to the bolster structure. Also the novel structure of the car of the present invention has shear panels connecting the upper intermediate side sill to the lower stub side sills and there are shear panels above those shear panels connecting the end portions of the intermediate center sill to the top chord, i.e., upper sill, for both ends at each side of the car.

Of course, hopper cars are provided with various constructions to open, close and lock the doors. Some of these constructions are shown in the three patents mentioned above. Many of these door-operating mechanisms are constructed to rotate a shaft on which the door is fixedly mounted for movement of the door by rotation of the shaft. Through gears the shaft is rotated by power means located at one end of the car. In other constructions fluid power cylinders have been used to open hopper doors. Two of these other constructions are disclosed in U.S. Pat. Nos. 3,076,680 and 2,991,730.

In the hopper vehicle disclosed in U.S. Pat. No. 3,076,680, the bottom portion of the side walls slopes inwardly, and on each of the two bottom sloping portions of the side walls is mounted a bracket on which is pivotally mounted the air cylinder that extends upwardly and inwardly toward the central plane of the vehicle. The end of the piston is connected to one end of a link that is connected to the distal end of the pivotally mounted door. The end of the rod is also connected to the link that is pivotally mounted to a partition wall. With this construction a retraction of the piston rod opens the door to provide a central bottom opening extending longitudinally of the vehicle.

In the construction of U.S. Pat. No. 2,991,730, there are two power cylinders. Each is pivotally mounted to a center support. The end of each piston rod is pivotally connected to a lever that is connected to a hopper door pivotally mounted external of and adjacent the bottom end of the side wall. These doors when closed provide the entire flat floor of the vessel. In this construction the doors swing downwardly. To provide a full opening, the ends of the doors will be at a substantially lower position.

There are patents disclosing overcenter toggle actuators for hopper car doors as well as a number of patents generally relating to toggle operator members for hopper doors. Other patents disclose spring bias means in combination with a door actuator. Still other patents relate to constructions for latching of hopper doors. Illustrative construction of latching mechanisms are shown in U.S. Pat. Nos. 1,472,539, 2,888,883, 3,238,898 and 3,712,248. More recent patents disclosing locking devices for a hopper door are U.S. Pat. Nos. 3,581,672, 3,626,865 and 3,654,873. U.S. Pat. Nos. 1,124,479 and 1,745,124 disclose doors with a curved construction. These come together to form a single hopper. These doors are pivotally mounted substantially inward of the vertical upper portion of the sides. Their constructions and mounting are such that substantial clearance below the car is required for a full opening of the doors. U.S. Pat. Nos. 1,124,479, 1,745,124 and 3,361,478 disclose doors with channel or box members to provide rigidity etc.

U.S. Pat. No. 3,717,110 shows another construction for a "sill-less type" hopper car. The type of the hopper car with the center sill extending the full length, that was mentioned earlier, is shown in U.S. Pat. No. 3,710,730.

SUMMARY OF THE INVENTION

The hopper vehicle of the present invention has a pair of bottom hoppers extending lengthwise of the vehicle on opposite sides of the vertical central plane of the vehicle. The vehicle comprises: a supporting structure and a body structure. The supporting structure includes support means extending from about one end of the vehicle to about the other end of the vehicle and located at the bottom portion of the vehicle for mounting on wheeled assemblies of the vehicle. The body structure includes end walls; side walls; an inverted generally V-shaped panel extending lengthwise of the vehicle and mounted on said support means to provide a part of two hoppers of said vehicle; and a door assembly (sometimes herein referred to simply as a door) hingedly mounted at its upper margin on each of said side walls to swing outwardly and constructed to provide the balance of one of said two hoppers of the vehicle.

The hopper vehicle further includes a door-operating mechanism for each of said door assemblies and located intermediate the length of the door assembly. Each of said dooroperating mechanisms includes a lever pivotally mounted at its bottom end of the bottom margin of said door assembly and having adjacent to its bottom end an extension that extends downwardly and toward the central plane of the vehicle and that is constructed to provide a latching lug. The lever is movable between a first position abutting the inside of said door assembly when the door is unlocked and a second position, when the door is closed, at which said extension is at its latching position to lock the closed door assembly. Each door-operating mechanism also includes power means mounted on said support means and operatively connected to said lever to provide a force on said lever in one direction for movement of said lever from said second position to said first position to unlock the door assembly and subsequently through said lever to provide part of the outer opening movement of said door assembly and to provide a force in the opposite direction on said lever for return movement of said door assembly to its closed position and subsequent movement of said lever from said first position to said second position.

The door-operating mechanism also has means operatively connected to said lever to provide against said lever, when in its first position, a sufficient force to prevent movement of said lever from said first position when the power means provides a force in said opposite direction greater than the force of gravity operating on the door assembly for movement of said door assembly to its closed position.

The hopper vehicle also has two locking means, preferably lugs, mounted on said supporting structure in alignment with said levers, each to be engaged by one of said latching lugs provided by said extensions of said levers after said door assemblies are closed and said levers have been moved to their second positions. The locking means and the latching lugs are constructed so that, when each of said levers is in its said first position and the door assembly on which it is mounted is being moved to said closed position, said latching lug clears said locking means with which it is engaged when said lever is moved to its second position after the door is closed.

The vehicle has wheeled subassemblies on which end portions of the support means for V-shaped panel are mounted.

In a preferred aspect of the vehicle of the invention the door assembly has an opening in alignment with a top portion of the lever of the door-operating mechanism. In this case the top portion of the lever has an angular extension that is directed toward that opening in the door assembly so that the extension and thereby the lever can be grasped from outside the door assembly, when it is closed and locked, for the purpose of moving the lever from the second position to the first position to unlock the door assembly by disengaging the latching lug from the locking lug. It is preferred that this extension of the lever extend through the opening in the door panel of the door assembly when the lever is in the second position and that in this extension there is a hole adjacent its distal end for easy grasping of the extension by power means alongside the vehicle to move the lever for unlocking the door assembly. This construction makes possible the opening of the door without the use of the power means mounted on the support means and connected to the lever and, of course, makes possible the opening of the door when that power means is inoperative.

In the preferred construction that provides for three-point locking of each door assembly, the lever of each door-operating mechanism is fixedly mounted on torsion means that is rotatably mounted on the bottom margin of the door assembly and extends horizontally from one end of the door assembly to the other end. As seen below in the description of the preferred embodiment of the vehicle as a freight hopper car, this torsion means can be formed of three components connected to one another with the intermediate component being a connecting tube on which the lever is fixedly mounted and the other two components are torsion bars fixedly mounted on the end portions of that connecting tube. At the ends of the torsion means that extends from one end of the door assembly to the other end there are mounted latching arms that pivot with the pivotal movement of the lever and when the latter is in its second position these latching arms at the ends of the torsion means engage keepers, i.e., locking lugs mounted on the supporting structures of the vehicle.

In this preferred construction the torsion means, i.e., torsion bar linkage, which interconnects the end latching arms with the lever and thus with the power-operated mechanism, is within a horizontal reinforcing member or chord mounted on the bottom margin of the door panel of the door assembly to provide support for the torsion bar linkage that provides pivotal movement of the end latching arms in concert with the pivotal movement of the intermediate lever. The bottom chord in cooperation with a horizontal upper chord of the door assembly provides torsional stiffness of the door assembly thereby inhibiting torsional deflection or wobble of the door assembly. This torsional stiffness of the door assembly improves its opening and closing characteristics and insures that the door assembly when closed will provide adequate sealing of the opening by the door so that material will not be lost from the vehicle when it is in transit. Of course, the door panel has an intermediate opening through which passes the intermediate lever that is mounted on the torsion bar linkage.

In the preferred construction of the vehicle of the invention each of the side walls of the body structure is provided in part by a side panel that constitutes an upper part of the side wall and usually the end portions of the side walls. In this case the door assembly for each side is constructed to provide the intermediate part of the lower portion of the side wall as well as to provide one side of the hopper on that side of the center line of the vehicle.

There is on each side an upper intermediate side sill extending the length of the side panel at the elevation of the bottom margin of the side panel above the opening for the door assembly. The door assembly mounted on this intermediate side sill closes the opening.

It is a preferred construction, at least when each door assembly provides a part of the side wall of the vehicle as well as a part of the hopper, that the lever of the door-operating mechanism is a first lever of a toggle assembly. The second lever of the toggle assembly is pivotally connected at one end to the end of the first lever that is not pivotally mounted on the door assembly. The other end of the second lever is pivotally mounted on support means fixedly mounted on the top margin of the door assembly. The support means is constructed to permit axial movement of the second lever. Spring means is mounted on the second lever between the support means and an intermediate portion of the second lever to bias the second lever in a direction away from the pivotal axis of mounting of the second lever on the support means. The spring means thereby constitutes the means operatively connected to the top portion of the first lever to provide the sufficient force against the first lever when it is in its first position to prevent movement of that lever from that position while the power means is moving the door assembly to the closed position. When the first lever is at its first position, the toggle assembly is in a nonlocking overcenter condition that is one side of the plane at which all three pivot axes of the toggle are centered, i.e., in alignment. When the first lever is at its second position, the toggle assembly is in a locking overcenter condition on the other side of that plane. The first overcenter condition is the more important one for utilization of the spring bias action as the spring has sufficient force to maintain the first lever at its first position until the power means through the first lever has completed the pulling of the door assembly toward the closed position.

As a freight hopper car, the embodiment of the vehicle of the invention, in which the door assembly on each side provides a part of the side wall as well as a part of a hopper, includes for each side an upper sill that extends the length of the body structure of the car and that has connected to it the top of the side panel. For each side the car also includes a side sill having three separate components, viz., an upper intermediate side sill and a pair of lower stub side sills. At each end the lower stub sills are mounted on a bolster structure that is mounted on the truck at that end of the car. The support means includes the conventional center sill that extends over the two trucks and is connected also to the bolster structure for mounting the car body to the trucks. The upper intermediate side sills are located at an elevation corresponding to the elevation of the bottom margin of the side panels above the door assembly for each side. Usually each side panel has at its ends a lower portion that is at the elevation of the door assembly so that the bottom intermediate margin of the panel is above its intermediate cut-out portion. On each side the side panel is secured to the upper intermediate side sill.

Each intermediate side sill extends to about a transverse plane passing through the bolster structures. These end portions of the upper intermediate side overlie and are spaced from a portion of the lower stub side sills. For each end of each side of the car a shear panel is connected at its top margin to the overlying end portion of the upper intermediate side panel and at its bottom margin to the lower stub side panel. Above each of these shear panels is a second shear panel that has its bottom margin connected to the overlying end portion of the upper intermediate side sill and has its top margin connected to the upper sill.

In view of the construction stated above for the preferred embodiment of a freight hopper car, it is seen that the side walls of the body of the car are provided by the side panels and the doors, while the doors at the lower portion also provide a part of the floor of the car. That bottom portion of the doors and the inverted V-shaped panel provide a floor having two lengthwise hoppers that are on opposite sides of the central plane of the car.

In the preferred embodiment of the door-operating means the power means comprises a pair of power cylinders, e.g., air cylinders, extending in opposite directions in a transverse plane and pivotally mounted on the longitudinal support means. The first lever of each toggle assembly is pivotally connected to the respective rod of the cylinders. The toggle assembly is also constructed so that it is in the nonlocking overcenter condition until the piston rod is retracted sufficiently to close the door and is then moved to its locking overcenter condition as the piston rod is further retracted. The spring is always compressed to some extent. The lower portion of the first lever of the toggle assembly is constructed with an extension providing an integral latching lug that, when the door is closed and the piston rod is further retracted, engages a locking lug mounted on the fixed body structure, as described earlier.

When the first lever of the toggle assembly is fixedly mounted on a torsion bar linkage that is rotatably supported by the bottom margin of the door and that extends longitudinally in opposite directions, there are latching arms fixedly mounted on the free ends of the torsion bar linkage. Keepers, i.e., locking lugs, are mounted on the body structure of the car to be engaged by those latching arms when the door is closed. The overall construction provides an overcenter latching at the ends of the doors when the torsion bar linkage turns the latching arms to engage the corresponding keepers due to the movement of the toggle assembly to its second overcenter condition by the last part of the retraction of the piston rod.

The hopper vehicle further includes a shroud or shield that overlies the door-operating mechanism. The shield has a roof and spaced walls between the side panels and between the doors. The shield extends downwardly to a location adjacent the bottom of the door assembly when it is closed. The preferred structure of the shield is described later.

DESCRIPTION OF THE DRAWINGS

FIG. 4 is a fragmentary cross section of the car taken along the line 4—4 of FIG. 1 with the preferred embodiment of construction of the toggle means and by phantom lines showing the position of the toggle means when the piston rod has been partially extended to provide complete unlocking of the door and showing the position of the toggle means and the door when the air cylinder has completely opened the hopper door and with the two air cylinders pivotally mounted about separate axes instead of being pivotally mounted about a common axis as shown in FIGS. 2 and 3.

FIG. 5 is a fragmentary view taken along line 5—5 of FIG. 4.

FIG. 6 is a fragmentary view taken along line 6—6 of FIG. 4.

FIG. 7 is an enlarged fragmentary view of a portion of the construction shown in FIG. 4 with the door omitted.

FIG. 8 is an enlarged fragmentary side view of the car shown in FIG. 1 with the door omitted to show the construction of a portion of the car that is partially covered by the lower righthand portion of the closed hopper door and differing from the construction shown in FIG. 1 in that the latching mechanism is beyond the end of the door panel.

FIG. 9 is a view taken along line 9—9 of FIG. 8 showing the construction of the locking lug assembly for locking that end of the door and showing in phantom the latching lug and torsion bar for that end of the door.

FIG. 10 is a fragmentary end view of the hopper door showing the latching lug in full lines in its released position and showing in phantom lines its locking position and its overtravel position that is obtained when there is the overcenter condition for the toggle at the completion of retraction of the rod of the air cylinder.

FIG. 11 is a fragmentary sectional view taken along line 11—11 of FIG. 1.

In the drawings some of the same or similar components are identified by the same numeral.

DETAILED DESCRIPTION

Figure 1:
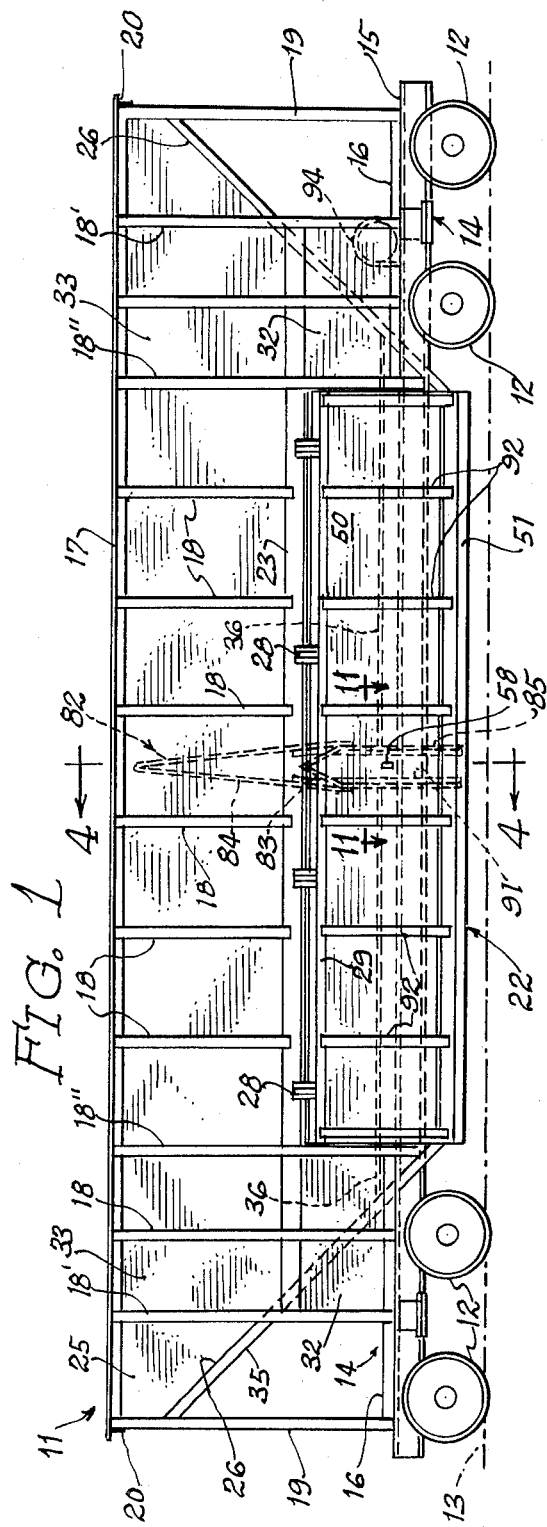
FIG. 1 is a side view of a freight hopper car that is the preferred embodiment of the hopper vehicle of the invention.

As seen in FIG. 1, the invention as a freight hopper car generally indicated at 11 has front and rear truck assemblies that contain wheels 12 that ride on a pair of rails 13, one of which is shown as a phantom line. Both ends of car 11 have a bolster structure generally indicated at 14 that is mounted on the truck assemblies at the ends of car 11. Mounted on the bolster structures is a horizontal center sill 15 that extends the complete length of the car. For each side of the car at its ends there are lower horizontal stub side sills 16 that are also mounted on bolster structures 14. Of course, each bolster structure includes, as is conventional, a truck bolster and a body bolster.

The body of car 11 is mounted on supporting structure that includes lower stub side sills 16 and center sill 15. For each side the car body includes a horizontal top chord or top sill 17 and a number of vertical side stakes 18 spaced from one another in the direction of the longitudinal axis of car 11. Adjacent each end of each side of car 11, the side stake closest to the end is designated 18' and the third one from the end is designated 18''. The body of car 11 has vertical corner stakes 19. The ends of two top chords 17 are connected to the top ends of corner stakes 19 and to two horizontal end chords 20. The top ends of corner stakes 19 are also connected to the ends of end chords 20. The four side stakes 18' are located at the two transverse planes passing through the pivotal axes of the truck bolsters.

Each side of car 11 has a hopper door assembly generally indicated at 22 that extends lengthwise of car 11 and has its upper portion forming a part of that side of car 11. The side stakes 18'' are located adjacent the ends of hopper door assemblies 22. In other words, each hopper door assembly 22 is between side stakes 18''. The body of car 11 also has, for each side, an upper horizontal intermediate side sill 23 that is connected to all of side stakes 18, including side stakes 18' and 18''. At each side of car 11, side stakes 18' and 18'', as well as side stake 18 between them for each end of the car, extend the full height between top chord 17 and lower stub side sills 16 to which they are connected. The side stakes 18 between side stakes 18'' are shorter and are connected at their bottom ends to upper intermediate side sill 23. Their top ends are connected to top chord 17. The side stakes 18 between side stakes 18'' are shorter because a side panel 25, constituting, for each side of the car body, a major part of that side, has a bottom cut-out portion. The panel 25 extends at its top margin from corner stake 19 at one end to corner stake 19 at the other end of that side. A short distance below the top margin of panel 25 the bottom corner of the ends of panel 25 generally coincides with the line defined by adjacent sloping end wall panel 26. The intermediate bottom cut-out of side panel 25 generally is defined by the area below upper intermediate side sill 23 and between side stakes 18'''. At this area door assembly 22 is mounted.

Each hopper door assembly 22 is pivotally mounted on upper intermediate side sill 23 by a number of hinge assemblies 28 shown somewhat schematically in FIG. 1. Each of hinge assemblies 28 includes a number of hinge lugs mounted on side sill 23 and others mounted on the upper chord 29 of door assembly 22. Through these two sets of lugs is passed a hinge pin 30 (FIG. 4) that is held in place with a cotter key (not shown). The pins 30 are in alignment and provide the pivotal axis for movement of door assembly 22.

For each side of car 11 there is located adjacent each end a shear-resistant side panel 32 and a shear-resistant panel 33. The shear panel 32 is connected to side stakes 18' and 18" and to the portions of upper intermediate side sill 23 and lower stub side sill 16 between these two side stakes where upper intermediate side sill 23 overlies lower stub side sill 16. Similarly each shear panel 33 is located between side stakes 18' and 18" to which it is connected. The shear panel 33, which is thus above shear panel 32, is also connected at its top margin to top chord 17. At its bottom margin shear panel 33 is connected to the end portion of upper intermediate side sill 23 that overlies lower stub side sill 16 as mentioned above. The purpose of shear panels 32 and 33 as a part of the unique construction of the body of car 11 will be described in some detail later. It will be noted from FIG. 1 that generally all of shear panel 33 and a part of shear panel 32 cover an area in common with side panel 25. Of course, because of this it would not be necessary to have panel 25 extend beyond side stakes 18" toward the ends of car 11. In that case separate panels would be secured along the sides between end corner stakes 19 and side stakes 18' within the area defined by those stakes and top chord 17 and sloping end wall panel 26. In that case panels 32 and 33 provide part of each side of car 11. This description of an alternative construction of the sides of car 11 is not meant to imply that side panel 25 is required to be a large panel. Instead, it can be made up of individual panels each of which along its vertical margins are connected to side stakes to provide basically a continuous side wall.

It is seen from the foregoing that there is a specific structure of each side of car 11 that provides for transfer and distribution of longitudinal forces due to buff and draft loads. The construction of the car of the invention provides for this transfer of longitudinal forces in a manner that permits, in the construction, the use of doors that function both as a part of the side walls and a part of the floor of lengthwise hoppers. This construction has a continuous center sill but the side sill is in the form of three components, namely, two lower stub side sills at the ends and an upper intermediate side sill that has its end portions overlying a portion of the lower stub sills. The shear panels 32 and 33 distribute longitudinal and vertical forces between lower stub sills 15 and the side girder construction provided by top chords 17 and upper intermediate side sills 23.

The end sloping sheets, i.e., sloping end wall panels 26, are reinforced with members 35 that extend under panels 26 in planes parallel to the longitudinal axis of car 11. The members 35 extend from ends of car 11 downwardly to about the transverse plane passing through side stakes 18".

Figure 2:
FIG. 2 is a fragmentary cross section, partially broken away, of the car of FIG. 1 looking to the left from a position to the right of middle of the car with the hopper doors closed and showing one form of the toggle means of the invention for actuating the doors.

As mentioned above, doors 22 provide part of the floor of the body of car 11. The balance of the floor is provided by two inverted V-shaped panels 36 that extend lengthwise of the car from sloping end panels 26 and are supported on center sill 15. The ends of V-shaped panel 36 are suitably shaped to abut sloping end panels 26 to which they are connected. As seen in FIG. 2, when door assemblies 22 are closed the bottom portion of these doors provide with V-shaped panels 36 a floor with two lengthwise hoppers that are on opposite sides of the central axis of car 11.

Of course, the car body includes end panels 26' that are connected to end chords 20 and corner stakes 19 to close off the end of the car body above the top ends of sloping end panels 26.

The body structure of car 11 on each side of center sill 15 includes a number of reinforcing members 37 (FIG. 4) that are supported by center sill 15 at various longitudinally spaced locations. The reinforcing members 37 extend downwardly and outwardly toward one or other side of the car. The V-shaped panels 36 on each side of center sill 15 are supported by sloping end panels 26 and are stiffened by reinforcing members 37 that are below them. Each Z-shaped bar 38 is mounted on the bottom ends of reinforcing members 37. The bar 38 extends the length of door assembly 22 and serves as a bottom stop for the door assembly. The structure of car 11 also includes, for each side, a pair of members 39 (FIG. 8) that are abutted by ends of door assembly 22 when it is closed.

Each member 39 is mounted on a supporting structure that includes a plate 40 at the bottom of which there is also mounted a plate 41 that supports a locking lug assembly generally indicated at 42 (FIG. 9). The assembly 42 includes a locking lug base plate 43 mounted on plate 41. Adjustably mounted on plate 43 is a keeper or locking lug 44 that has an extension with a cam surface to be engaged by a latching lug or arm 45 fixedly mounted on a torsion bar 46 of door assembly 22.

For each side of car 11 car door assembly 22 includes a door panel 50 that extends the full length of the door. The upper chord 29 of car assembly 22 is mounted on the outside surface of the top margin of panel 50. A lower chord 51 extends the length of panel 50 and is mounted on the bottom margin of panel 50. Each door assembly 22 has a pair of torsion bars 46 that are shown as tubes. The bars 46 extend in opposite directions from a central zone of the door. Each torsion bar 46 is rotatably mounted within bottom chord 51. Each torsion bar 46 is supported adjacent its ends by a bearing plate 52 mounted on lower chord 51 by means not shown. Each torsion bar 46 extends beyond the corresponding end of bottom chord 51 and latching lug 45 is fixedly mounted on that end portion, as seen in FIG. 8. As seen in FIG. 6, the other end of each torsion bar 46 is fixedly mounted on an end portion of a connecting tube 53 by bolts 54 and nuts 55. The rotation of connecting tube 53 causes rotation of both of torsion bars 46. The connecting tube 53 extends through an opening at the free end portion of a lever 56 of a toggle assembly generally indicated at 57 (FIG. 4). The connecting tube 53 is welded to lever 56 so that tube 53 and thereby the pair of torsion bars 46 of door assembly 22 are turned about their axes when lever 56 is pivoted about the axis of connecting tube 53.

The center of door panel 50, which is at the transverse plane of the car passing through lever 46, has an opening 58 through which extends an arm 59 that is integral with lever 56. The arm 59 extends angularly from the other end of lever 56 where it is connected by a pin 60 to the clevis end of the other lever 61 of toggle assembly 57. Except for the clevis end of lever 61 the rest of its length is a cylindrical rod that is threaded at its distal end portion. A spring retainer block 62 has trunnions 63 that fit in a pair of slots 64 that are in the pair of spaced brackets 65 mounted on a support plate 66 bolted through door panel 50 to upper chord 29 so that slotted brackets 65 extend inwardly of car 11 from panel 50 at its top margin. There are two springs 67 mounted on lever 61 between its clevis end and spring retainer block 62. A wear plate 68 is mounted on lever 61 between springs 67.

To install toggle assembly 57, lever 56 mounted on installed connecting tube 53 is connected by pin 60 to lever 61. A nut 69, on the threaded end of lever 61, is turned to move spring retainer block 62 sufficiently along lever 61 toward the clevis for alignment of trunnions 63 with slots 64. This movement of nut 69 compresses springs 67. After trunnions 63 have been aligned with slots 64, nut 69 is unscrewed to allow trunnions 63 to move upwardly to the base of slots 64. Also mounted on pin 60 between the arms of the clevis end of lever 61 is a clevis 70 mounted on the free end of a piston rod 71 of an air cylinder 72 pivotally mounted at its other end by its clevis 73 through which extends a pin 74 on a support bracket 75 that is mounted on center sill 15. The nut 69 is then rotated further to the position shown in FIG. 4 and can even be removed. The ends of toggle assembly 57 are connected now to the top and bottom margins of door assembly 22.

The lever 56 is bifurcated adjacent the end of it that is fixedly mounted on connecting tube 53 to provide an extension that is shaped to function as a latching lug 76 integral with lever 56.

A locking lug 77 for each door assembly 22 is adjustably bolted on a plate 78 that is fixedly mounted on a slope sheet 78' mounted on the supporting structure as described below.

The toggle assembly 57 has its levers 56 and 61 pivotally mounted at the axis of connecting tube 53 and the axis of trunnions 63, respectively. The levers 56 and 61 at their other ends are pivotally joined by pin 60. When hopper door assembly 22 is fully closed and locked, toggle assembly 57 is at its locked overcenter condition, i.e., overcenter to the right as viewed in FIG. 4. At that time piston rod 71 is retracted.

When door assembly 22 is fully closed and locked, it is not necessary to maintain the retraction force on piston rod 71 to maintain the locking of door assembly 22. Air cylinder 72, and thus its piston rod 71, and springs 67 could fail simultaneously and yet door assembly 22 would remain closed and locked. This is because the geometry of the bearing surfaces of latching lug of extension 76 and locking lug 77 is such that when they are arranged, they will maintain door assembly 22 in the closed position and the same is true for the geometry of the bearing surfaces of latching arms 45, at the ends of door assembly 22, and locking lugs 44. This geometry of these bearing surfaces is such that the load in car 11 that acts on door assembly 22 does not tend to unlock these engaged bearing surfaces. Of course, this locked overcenter condition of toggle assembly 57 is assured by springs 67 that inhibit the pivotal movement of lever 56 that could otherwise unlock door assembly 22. The ends of hopper door assembly 22 are similarly provided with full locking by the locked overcenter condition because torsion bars 46 can only be turned when lever 56 is turned. As piston rod 71 is retracted past the center condition of toggle assembly 57, latching arms 45 are moved clockwise, as viewed in FIG. 10, beyond the first locking position shown in phantom lines to a further position, also shown by phantom lines. This overtravel increases the locking engagement of arms 45, adjacent the ends of the door, with locking lugs 44.

It is seen that there is a three-point locking. The locked overcenter condition of toggle assembly 57 assists in retaining latching arms 45 and latching extension 76 of lever 56 in their locked positions.

The door panel 50 has a bottom opening 79 midway its length. The lever 56 that is fixedly mounted on connecting tube 53 extends through this opening. The extension 76 that serves as a latching lug for lever 56 is inwardly of door panel 50 so that it can engage locking lug 77. The lug 77 can be adjusted upwardly or downwardly on slope sheet 78' to insure a satisfactory locking engagement between latching lug 76 and locking lug 77 when piston rod 71 is sufficiently retracted.

The door-operating mechanism of the preferred embodiment of the invention includes the pivotal mounting of air cylinder 72 so that it extends transversely the car and is pivoted about an axis parallel to the longitudinal axis of the car. In that door-operating mechanism the free end of piston rod 71 is connected preferably to toggle assembly 57 at the common pivotal axis of levers 56 and 61 of toggle 57 that are mounted on the bottom and top margins of the novel side opening door.

The two door assemblies 22 that provide a part of two hoppers and a bottom part of the two sides of car 11 can, because of their construction and pivotal mounting, be moved outwardly beyond the plane of the corresponding side of car 11. Because each door assembly 22 also constitutes a movable part of a side of car 11, each door assembly 22 when fully moved outwardly provides a wide opening for more rapid discharge of material from the car and bridging of material across the opening in the car is minimized.

In the construction of door assembly 22, the upper portion of panel 50 of door assembly 22, when the door is closed, is a downward extension of the central part of fixed side panel 25 of car 11. At the same time the lower portion of the door is shaped so that the bottom margin abuts the body construction at the bottom end of V-shaped panels 36. As seen in FIG. 4, to meet these two conditions the preferred embodiment of door panel 50 has a vertical flat upper portion, an intermediate curved portion and an inclined flat bottom portion that extends, due to the intermediate curvature, to the location of the bottom longitudinal edge of V-shaped panels 36. At the sacrifice of some reduction in capacity of the car body, a major portion of panel 50 could be inclined and flat. In that case, panel 50 could have a top marginal flat portion that would be angularly disposed to that major portion. Alternatively, panel 50 could be flat from top to bottom and then it is pivotally mounted on intermediate side sill 23 so that, when door assembly 22 is closed, panel 50 extends downwardly and inwardly from its top to the bottom edge of V-shaped panels 36.

The lever 56 has its arm 59 extending outwardly from its end that is pivotally mounted on pin 60. The arm 59 (FIG. 4) extends through opening 58 (FIG. 1). The arm 59 has a hole 81 at its free end. In the event it is desired to manually operate toggle 57 for unlocking door assembly 22 a rod (not shown) can be inserted in a hole 81 and that rod would be manually pulled. Alternatively, arm 59 can be grasped and pulled by a power-operated device.

The pivotal movement of air cylinder 72 about the axis of pin 74 is shown in FIG. 4 in which in phantom lines there is shown the location of lever 56 after it has been moved to a fully unlocked condition and it abuts the inside surface of the flat lower marginal portion of panel 50 above opening 79. By further extension of piston rod 71 there is an upper pivotal movement of air cylinder 72 until door assembly 22 is completely open. When this condition is met, as seen by phantom lines, all of door assembly 22 is outside the vertical plane of panel 25.

When car 11 is loaded with material, such as coal, the weight of the load will swing open the doors as soon as the toggle assemblies 57 have been moved by their air cylinders 72 to the unlocking positions. The full opening of the doors is provided by the completion of travel of piston rods 71 of air cylinders 72. The cylinders 72 are operated in unison, so that the material is discharged from both sides at about the same time.

Due to the door construction of the present invention there is provided an unusually large discharge area. That is a highly desirable feature when unloading under severe winter conditions. That large discharge opening minimizes or eliminates problems often encountered during severe cold weather. Coal, laden with moisture from snow and freezing rains, can be frozen to great depths from one side of a car by strong directional winds. This condition can occur while in transit or while stored on a siding waiting to be unloaded. The large throat obtained by the construction of the door and its mounting, of the present invention, minimizes the hang-up of frozen masses of coal that can arch between the closely spaced structural parts that are present in conventional hopper cars. That arching, occurring with conventional cars, can result in discharge of coal from only one side of the car.

The car 11 has a shroud or shield generally indicated at 82 that extends from one side of the car to the other side. The shield 82 is located over and along two sides of the door-opening mechanisms to shield them from the material in car 11. Each power-operated, door-operating mechanism, as described above, includes air cylinder 72 with its piston rod 71 and toggle assembly 57 that is connected to piston rod 71, as described above, and that has its levers 56 and 61 connected to the bottom and top margins of door assembly 22.

Figure 3:
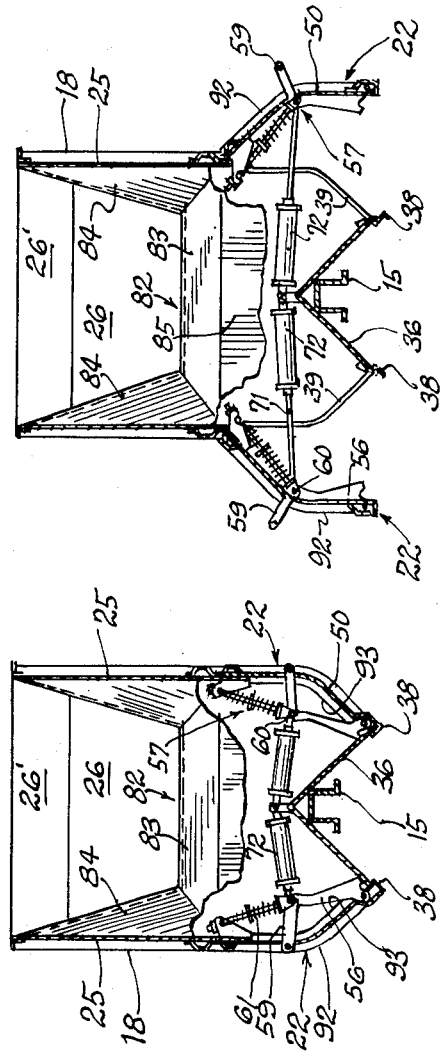
FIG. 3 is a cross section of the car like FIG. 2 but showing the doors in open position.

The shield 82 includes a central roof having downwardly diverging roof panels 82 that are shaped at the ends, as shown in FIGS. 2 and 3, to merge upwardly inclined end portions 84 of the roof extending to and connected to side panels 25. The shield 82 has a pair of spaced paralell side walls 85 that are on opposite sides of the door-operating mechanisms. The side panels 85 extend from roof panels 83 to the inner ends of inverted V-shaped panels 36 and to a position closely adjacent closed door panels 50. The shield 82 is provided with support members 86 that are connected to roof panels 83. The inverted V-shaped panels 36 at their inner ends are supported by shield 82. A set of members 87 are connected to the bottom of center sill 15 and they stiffen inverted V-shaped panels 36. The support members 86 have openings 88 through which extend air cylinders 72. The openings 88 have a sufficient vertical dimension so that air cylinders 72 can move sufficiently about their pivotal axes without contacting support members 86.

Each slope sheet 78' is supported at its bottom margin by Z-shaped bar 38 and is connected at its inclined ends to side walls 85 of shield 82. The slope sheets 78' provide an internal brace for side walls 85 as well as provide a support for locking lugs 77. The slope sheets 78' do not extend to the top elevation of inverted V-shaped panels 36 so that clearance is provided for the mounting of air cylinders 72. The two inverted V-shaped panels 36 and the two slope sheets 78' between them may be one sheet but the structure shown and described is preferred.

At the juncture of central roof 83 and the end roof portions 84 there is a reinforcing plate 89 that is connected to side walls 85. The plate 89 extends downwardly and outwardly towards door assembly 22. The bottom portion of plate 89 has a U-shaped opening at which there is a reinforcing strip 90 connected to plate 89 at the sides and top of this bottom opening.

For both sides of car 11, L-shaped brace members 91 are mounted on the opposed marginal surfaces of side walls 85 of shield 82, as seen in FIGS. 1 and 11, to function as edge stiffeners for side walls 85 and as a sealing strip as described below. The members 91 extend essentially the full height of side walls 85. The distal edge of each member 91 conforms in shape to the corresponding edge of side wall 85 to which member 91 is connected so both edges conform generally to and are spaced slightly from door panel 50 when door assembly 22 is closed. The outwardly facing U-shaped channel formed by side wall 85 and member 91 serves to reduce passage of material into the zone defined by shield 82 from the rest of the car body. As seen in FIG. 11, each door assembly 22 has a pair of spaced, generally vertical reinforcing members 93 mounted on the inside face of panel 50 intermediate its length and located to be within that pair of U-shaped channels provided by side walls 85 and brace members 91 of shield 82 to further minimize passage of material into the zone within shield 82. For passage it would be necessary for the material to follow a tortuous path defined by side wall 85, member 93 and member 91. This construction permits side wall 85 to be spaced slightly from door panel 50 when door assembly 22 is closed without interfering with the ability to obtain a fully closed door condition.

The reinforcing members 93 on panel 50 also minimize the likelihood of distortion of that panel in the area where it should be spaced from but close to side walls 85 of shield 82 so that the door can be closed fully with clearing of the locking lugs by the latching lugs and yet the close spacing of panel 50 and shield 82 is obtained when door assembly 22 is closed.

Each door assembly 22 is provided with a number of intermediate and end parallel door stiffeners 92. One end of each door stiffener 92 is connected to upper chord 29 while the other end is connected to bottom or lower chord 51. The door stiffeners 92 are contoured to abut panel 50 from top to bottom.

As seen in FIG. 1, the freight hopper car 11 of the preferred embodiment of the invention has an air pressure tank 94 that is provided with pressurized air. The tank 94 is connected with suitable piping and valves (both not shown) to air cylinders 92. The operation of these valves determines the simultaneous operation of air cylinders 72. Such valves can be operated manually but it is preferred that they be tripped automatically by means alongside the track so that each air cylinder 72 will extend its piston rod 71 while such cars are in motion. After the cars have passed the unloading station the valve mechanism can be operated manually or automatically to close and lock the doors through retraction of piston rods 71.

As stated earlier, there is a pair of members 39 that are abutted by the ends of door assembly 22 when it is closed. Thus members 39 are located behind the ends of door assembly 22 between but adjacent side stakes 18''. As seen in FIG. 3, members 29 are contoured like door panel 50. Members 39 are longer than the height of door panel 50. The top portion of member 39 is secured to side panel 25 at the elevation of upper intermediate side sill 23. The bottom end of each member 39 is secured to Z-shaped bar 38.

For an opening of the two hopper door assemblies 22 the two door-operating mechanisms are operated simultaneously by energizing air cylinders 72. Each door-operating mechanism then has an outer movement of piston rod 71 that initially further compresses springs 67 until the pivot axes of trunnions 64, pin 60 and tube 53 are in alignment. Further pivotal movement of lever 56 about the axis of connecting tube 53 causes latching lug 76 to clear locking lug 77. At the same time torsion bars 46 are rotated to move latching arms 45 so that they clear locking lugs 44. As soon as latching lug 76 and latching lugs 45 are clear of their corresponding locking lugs, lever 56 bears against door panel 50 below opening 58. The extension of piston rod 71 continues to provide an opening of door assembly 22 until it is completely beyond the vertical plane containing side panel 25. During part of this movement the door is opening due partly to the weight of the load in car 11, as described earlier. The fully open door assembly 22 is shown in phantom in FIG. 4 where the bottom flat portion of panel 50 is substantially parallel to but outside the plane containing side panel 25.

When it is desired to close and lock door assembly 22, each air cylinder 72 is energized to retract its piston rod 71. The air cylinder 72 through its piston rod 71 connected to pin 60 controls the falling of door assembly 22 until its center of gravity is exactly below hinge pin 30. From this position of door assembly 22 the further retraction of piston rod 71 produces a pulling force on pin 60 and thus through lever 56 to bring door assembly 22 back up to its closed position. The springs 67 are sufficiently strong so that as door assembly 22 is being closed there is no rotation of lever 56 about its pivot axis and thus clearance is maintained between latching lug 76 and locking lug 77 until door assembly 22 is completely closed. With further retraction of piston rod 71 the pulling force by retracting rod 71 turns lever 56 further about the pivot axis of tube 53. Until the axes of trunnions 64, pin 60 and tube 53 are in alignment lever 61 is moved upwardly through block 20 and this causes further compression of springs 67. After these axes are brought into alignment, further retraction of rod 71 moves levers 56 and 61 about their pivot axes and the compression is partially reduced in springs 67. The toggle assembly 57 is now at its locked overcenter condition. The latching lug 76 by pivotal movement of lever 56 has been brought into locking position. Through the simultaneous rotation of torsion bars 46 with pivotal movement of lever 56, latching lugs 45 are moved into locking position against locking lugs 44.

The geometry of the bearing surfaces of those lugs prevents unlocking until lever 56 is pivoted about its axis toward door assembly 22. The reaction forces where latching lugs 76 and 45 contact locking lugs 77 and 44 produce a closing moment about the axis of torsion bar 46 to provide a self-energizing locking condition. The weight of the load acting on door assembly 22 and the weight of the door assembly force the latching lugs more tightly against the locking lugs.

Also, springs 67 inhibit movement of latching lugs 76 and 45 away from locking lugs 77 and 44 when toggle assembly 57 is in its locked overcenter position. However, the prime function of springs 67 is to prevent movement of toggle assembly 57 from its unlocked overcenter condition in which lever 56 bears against door assembly 22, until door assembly 22 is closed.

The preferred embodiment for the freight hopper car of the invention has for each side one long door that extends the full length of the floor that is provided in part by inverted V-shaped panels 36. In another embodiment each side may have two or more doors each of which provides a part of the length of one of the hoppers of a car and a part of the central portion of the side of the car. Each of these doors would have a door-operating mechanism that has been described above and, of course, there would be an opposite door along the other side with its door-operating mechanism of the type described. In that case there would be partitions to separate the compartment into sections arranged in a longitudinal direction and each partition would have a downwardly diverging walls extending to the floor of the car. The top of these partitions could be at about the elevation of upper intermediate side sills 23.

For at least the construction of the hopper freight car in which the side doors extend the full length of the floor, it is preferred that the construction includes the components that provide the three-point locking of each door instead of merely central locking. In a freight hopper car having a single long hopper door assembly for each side the construction providing this three-point locking is important because of the length of the hopper door assembly. When the hopper vehicle is a freight hopper car for coal or the like, the length of the car body is illustratively almost 50 feet. The length of a single long hopper door assembly in such case would be more than about 20 feet. For a door of such length it is necessary to provide sufficient structural reinforcement for the door panel so that its shape is maintained to insure that there will be an adequate closing and sealing of the door. The bottom chord 51 of door assembly 22 has a construction like chord 29, so that chord 51 in cooperation with chord 29 substantially inhibits torsional deflection or wobble of the door. The torsion linkage, i.e., torsion bars 46, that interconnects latching lugs 45 with lever 56 of toggle assembly 57, and bearing plates for bars 46 fit within bottom chord 51 that provides a protective housing and support for the torsion linkage, provides at its lower portion the rigid lower sealing edge of the door, and provides the previously mentioned adequate mechanical structure to minimize torsional deflection.

In an illustrative hopper freight car of the invention hauling coal or the like the height of each door assembly 22 is about five feet while the height of panel 25 above it is about ten feet. When closed, in this typical construction, the bottom of the door can be as close as 12 inches above the horizontal plane at the top of the rails of the track. The top of center sill 15 is about three feet above the horizontal plane at the top of the rails. Thus the tops of door assemblies 22 are several feet above the tops of center sill 15 and stub side sills 16. The lower chords 51 of door assemblies 22, when door assemblies 22 are closed, are below center sill 15 and are only about a foot above the horizontal plane at the top of the rails. In view of the construction of the car of the present invention with such dimensions there is a discharge opening of almost four feet which is the distance between the bottom end of panel 50 of the open door assembly 22 and the bottom edge of Z-shaped bar 38. This wide opening is possible with this construction even though the distance from the bottom of closed door assembly 22 is about one foot above the horizontal plane of the top of the rails. Furthermore, the construction provides for a downward and outward discharge so that most, if not all, of the coal or the like is discharged outside of the area defined by the pair of rails. This type of discharge is greatly preferred for automatic unloading while cars are in motion.

As mentioned earlier, freight cars are subjected to longitudinal forces due to buff and draft loads. In conventional freight cars these forces are divided between a center sill and side girders in accordance with their respective elastic properties. The basic construction of the car body of the freight car of the invention is a novel arrangement of structural members to provide this carrying of the longitudinal force in view of the fact that door assemblies 22 can not contribute to the transfer of the longitudinal force. A part of the longitudinal force at one end of car 11 is transferred from stub side sills 16 to shear panels 32 connected to those stub side sills. The force is distributed as a shear flow through shear panels 32 to intermediate side sills 23 to which shear panels 32 are connected. A portion of this force is further distributed through shear panels 33 to top chords 17 to which shear panels 33 are also connected. The shear panels 32 and 33 are an integral part of the side girders that include intermediate side sills 23 and top chords 17.

As seen in FIGS. 2, 3, and 4, the preferred embodiment of construction of side door assemblies 22 has panels 50 with a flat upper portion that extends down to about the horizontal plane containing the top of center sill 15. Also, when door assemblies 22 are closed, the pair of air cylinders 72, that are pivotally mounted above center sill 15 and that extend in opposite directions at a transverse plane, extend downwardly and outwardly to corresponding door assembly 22. As also seen in FIGS. 2, 3 and 4, lever 56 is shaped so that a part of its edge facing panel 50 bears against a part of the lower portion of panel 50 along a substantial part of its length after lever 56 has been pivoted to release latching lug 76 from locking lug 77.

The construction of the preferred embodiment of door assembly 22, extending the full length of the single opening in the side of the freight car, with its top chord 29 and bottom chord 51, the latter serving also as support for the torsional bar linkage, is such that the presence of an object, between one end of door assembly 22 and the door frame, that prevents full closing of door assembly 22 will not distort the door.

The foregoing detailed description of a preferred embodiment of a freight hopper car has been presented only for the purpose of illustration of the construction of the hopper vehicle of the invention. The present invention is limited only by the claims that follow.

We claim:

1. A hopper vehicle having a pair of bottom hoppers extending lengthwise of the vehicle on opposite sides of the vertical central plane of the vehicle, which comprises:

a supporting structure including support means extending from about one end of the vehicle to about the other end of the vehicle and located at the bottom portion of the vehicle for mounting on wheeled assemblies of the vehicle;

a body structure including:
end walls;
side walls;
an inverted generally V-shaped panel mounted on said support means and extending lengthwise of the vehicle and providing a part of said hoppers; and
a door assembly hingedly mounted at its upper margin on each of said side walls to swing outwardly and constructed to provide one side of one of said two hoppers of the vehicle;

a door-operating mechanism for each of said door assemblies and located intermediate the length of the door assembly, each of said door-operating mechanisms including:
a lever pivotally mounted at its bottom end on the bottom margin of said door assembly and having an inwardly directed extension that is constructed to function as a latching lug, said lever being movable between a first position abutting the inside of said door assembly when the door is unlocked and a second position spaced from the inside of said door assembly when the door is closed with said extension in its latching position to lock the closed door assembly;
power means mounted on said support means and operatively connected to said lever to provide a force in one direction for movement of said lever from said second position to said first position and to provide a force in the opposite direction on said lever for return movement of said door assembly to its closed position and subsequent movement of said lever from said first position to said second position; and
means operatively connected to said lever to provide against said lever, when in its first position, a sufficient force to prevent movement of said lever from said first position when said power means provides a force in said opposite direction greater than the force of gravity acting on door assembly for movement of said door assembly to its closed position; and
locking means mounted on said supporting structure in alignment with each of said levers to be engaged by said latching lugs provided by said extensions of said levers after said door assemblies are closed and said levers have been moved to their second positions, said locking means and said latching lugs being constructed so that when each of said levers is in its said first position and the door assembly on which it is mounted is being moved to said closed position said latching lug clears said locking means with which it is engaged when said lever is moved to its second position after the door is closed.

2. The hopper vehicle of claim 1 wherein:
each door assembly has an opening in alignment with a top portion of said lever of said door-operating mechanism for that door assembly; and
each of said levers has at its top portion an angular extension that is outwardly directed toward that opening in said door assembly so that said extension and thereby said lever can be grasped from outside said door assembly, when it is closed and locked, for the purpose of moving said lever from said second position to unlock said door assembly by disengaging said latching lug of said lever from said locking means.

3. The hopper vehicle of claim 2 wherein said angular extension of said lever extends through said opening in said door assembly when said lever is in its said second position.

4. The hopper vehicle of claim 1 and further including shield means mounted on said supporting structure and extending between the two sides of the vehicle to cover said door-operating mechanisms and having a roof above said door-operating mechanisms and having spaced side walls on opposite sides of said door-operating mechanisms and extending downwardly from said roof to said two hoppers.

5. The hopper vehicle of claim 4 wherein said side walls of said shield means have their edges adjacent but closely spaced from said door assemblies when closed and further including:
L-shaped brace members mounted on the opposed marginal surfaces of said side walls of said shield means at both sides of said vehicle to function as edge stiffeners for said side walls and having their distal edges conforming in shape to the corresponding edge of said side walls of said shield means so that said distal edges of said L-shaped brace members are adjacent but closely spaced from said door assemblies when closed; and
a pair of longitudinally spaced reinforcing members mounted on the inside surface of each of said door assemblies so that they extend into the U-shaped channels, formed by the marginal portions of said side walls of said shield means and said L-shaped brace members, to provide a tortuous path between the interior of the vehicle and the zone defined by said shield means when said door assemblies are closed thereby minimizing ingress of material into said zone, said reinforcing members also inhibiting distortion of said door assemblies in the area which they are closely spaced from said shield means when said door assemblies are closed.

6. The hopper vehicle of claim 1 wherein each of said door assemblies includes:
a door panel;
a horizontal upper chord mounted on said door panel; and
a horizontal chord mounted on the bottom margin of said door panel to inhibit, in cooperation with said upper chord, torsional deflection of said door assembly and to provide a rigid bottom edge sealing surface for said door assembly,
and wherein:
said lever is pivotally mounted on said bottom chord.

7. The hopper vehicle of claim 1 wherein each of said door assemblies is constructed to provide by its upper portion at least an intermediate part of a lower part of that side of said vehicle so that it is the lowest portion of said door assembly that provides said one side of one of said two hoppers of said vehicle.

8. The hopper vehicle of claim 7 wherein:
said end walls include sloping end sheets that extend downwardly toward each other to an intermediate zone;
each of said side walls has a side panel extending from the end walls of said body structure including said sloping end sheets and has an intermediate bottom cut-out portion at said intermediate zone; said inverted V-shaped panel extends from one of said sloping end sheets; and
each of said door assemblies being mounted at said intermediate zone to close the side of said body structure at the cut-out portion of said panel and to form said one side of said hopper within said intermediate zone.

9. The hopper vehicle of claim 8 and further including:
torsion linkage rotatably mounted on the bottom margin of each of said door assemblies, each of said torsion linkages including bars extending toward the ends of said door assembly at its bottom margin and said lever being fixedly mounted on said torsion linkage intermediate its length;
latching arms fixedly mounted on the ends of said bars adjacent the ends of said door assembly; and
a pair of locking means mounted on said supporting structure adjacent the ends of the bottom margin of each door assembly and in alignment with said latching arms mounted on said rods of said torsion linkage,
whereby said latching arms engage said pair of locking means when said door assembly is closed and said lever is in said second position with its latching extension engaging said locking means in alignment with said lever and whereby said latching arms are positioned to clear said pair of locking means when said lever is maintained at said first position during the closing of said door assembly so that said latching arms can be moved thereafter into locking position with said lever for a three-point locking of said door assembly.

10. The hopper vehicle of claim 1 wherein said means operatively connected to said lever to provide a sufficient force against said lever to maintain it in said first position during movement of said door assembly to its closed position comprises spring means mounted on said door assembly and connected to said lever.

11. The hopper vehicle of claim 1 wherein each of said power means includes a power cylinder and a piston rod, one of these being pivotally mounted on said support means about an axis parallel to the longitudinal axis of the vehicle and the other of these being operatively connected to said lever.

12. The hopper vehicle of claim 11 wherein each of said means operatively connected to said lever to provide a sufficient force against said lever to maintain it in said first position during movement of said door assembly to its closed position comprises:
a second lever pivotally connected at one end to the top portion of said first lever to constitute, with said first lever, a toggle assembly;
means pivotally mounting the other end of said second lever of each toggle assembly on the top portion of said door assembly and constructed to permit movement of said second lever along its longitudinal axis; and
spring bias means to provide said sufficient force on said first lever through said second lever to maintain said first lever in said first position during movement of said door assembly to its closed position by said power cylinder through said first lever, said toggle assembly being in one overcenter condition when said first lever is at its first position and being at a second overcenter condition when said first lever is at its said second position, said overcenter conditions being on the opposite sides of the plane passing through the three pivotal axes of said toggle assembly when they are in alignment.

13. The hopper vehicle of claim 12 wherein:
    said means pivotally mounting said other end of said second lever while permitting movement of said second lever along its axis comprises:
    a pair of space plates that extend inwardly from said door assembly and that have aligned slots extending from their edges in an upwardly inclined manner toward said door assembly; and
    a spring retainer block having a central opening and having trunions at its ends mounted in said slots;
    said second lever has a clevis construction at its said one end for pivotally connecting said second lever to said first lever and said second lever is constructed generally for the rest of its length in the form of a cylindrical rod extending through said central opening of said spring retainer block; and
    said spring bias means on said second lever is mounted on said cylindrical rod portion of said second lever between and abutting said spring retainer block and said clevis construction of said second lever.

14. The hopper vehicle of claim 13 and further including:
    a pair of locking means mounted on said supporting structure adjacent the ends of the bottom margin of each door assembly;
    a connecting stub tube mounted on the bottom margin of each door assembly for rotatable movement about a horizontal axis, said first lever being fixedly mounted on said stub tube for pivotal mounting of said first lever on the bottom margin of said door assembly;
    a pair of torsion bars fixedly mounted on the ends of each of said connecting stub tubes for rotation with it and extending toward the ends of said door assembly, said other end of each said torsion bar having fixedly mounted on it an arm constructed at its free end to constitute a latching lug, said arms being located at the transverse plane of said pair of locking means, adjacent the ends of the bottom margin of said door assembly, to provide a locking of said door assembly adjacent the ends with the locking of the door assembly by locking of said latching lug extension of said first lever with said locking means mounted on said supporting structure in alignment with said first lever.

15. The hopper vehicle of claim 1 and further including:
    shield means mounted on said supporting structure and extending between the two sides of the vehicle to cover said door-operating mechanisms and having a roof above said door-operating mechanisms and having spaced side walls on opposite sides of said door-operating mechanisms and extending downwardly from said roof to said two hoppers, said shield means having the edges of its side walls adjacent but closely spaced from said door assemblies when closed and said shield means further having L-shaped brace members mounted on the opposed marginal surface of said side walls of said shield means at both sides of said vehicle to function as edge stiffeners for said side walls and having their distal edges conforming in shape to the corresponding edge of said side walls of said shield means so that said distal edges of said L-shaped brace members are adjacent but closely spaced from said door assemblies when closed; and
    a pair of longitudinally spaced reinforcing members mounted on the inside surface of each of said door assemblies so that they extend into the U-shaped channels, formed by the marginal portions of said side walls of said shield means and said L-shaped brace members, to provide a tortuous path between the interior of the vehicle and the zone defined by said shield means when said door assemblies are closed thereby minimizing ingress of material into said zone, said reinforcing members also inhibiting distortion of said door assemblies in the area in which they are closely spaced from said shield means when said door assemblies are closed,
    and wherein:
    each of said door assemblies includes:
        a door panel;
        a horizontal upper chord mounted on said door panel; and
        a horizontal chord mounted on the bottom margin of said door panel to inhibit, in cooperation with said upper chord, torsional deflection of said door assembly and to provide a rigid bottom edge sealing surface for said door assembly, and said lever being pivotally mounted on said bottom chord;
    each of said door assemblies is constructed to provide by its upper portion at least an intermediate part of a lower part of that side of said vehicle so that it is the lowest portion of said door assembly that provides said one side of one of said two hoppers of said vehicle;
    said end walls include sloping end sheets that extend downwardly toward each other to an intermediate zone;
    each of said side walls has a side panel extending from the end walls of said body structure including said sloping end sheets and has an intermediate bottom cut-out portion at said intermediate zone;
    said inverted V-shaped panel extends from one of said sloping end sheets; and
    each of said door assemblies being mounted at said intermediate zone to close the side of said body structure at the cut-out portion of said panel and to form said one side of said hopper within said intermediate zone.

16. The hopper vehicle of claim 15 and further including:
    torsion linkage rotatably mounted on said bottom chord of each of said door assemblies, each of said torsion linkages including bars extending toward the ends of said door assembly at its bottom margin and said lever being fixedly mounted on said torsion linkage intermediate its length;
    latching arms fixedly mounted on the ends of said bars adjacent the ends of each of said door assembly; and
    a pair of locking means mounted on said supporting structure adjacent the ends of the bottom margin of each door assembly and in alignment with said latching arms mounted on said rods of said torsion linkage,
    whereby said latching arms engage said pair of locking means when said door assembly is closed and said lever is in said second position with its latching extension engaging said locking means in alignment with said lever and whereby said latching arms are positioned to clear said pair of locking means when said lever is maintained at said first position during the closing of said door assembly so that said latching arms can be moved thereafter into locking position with said lever for a three-point locking of said door assembly.

17. The hopper vehicle of claim 16 wherein:
each of said power means includes a power cylinder pivotally mounted on one end of said support means about an axis parallel to the longitudinal axis of the vehicle and a piston rod directed to that door assembly operated by said power means and operatively connected to said lever;
each of said means operatively connected to said lever to provide a sufficient force against said lever to maintain it in said first position during movement of said door assembly to its closed position comprises:
  a second lever pivotally connected at one end to the top portion of said first lever to constitute, with said first lever, a toggle assembly;
  means pivotally mounting the other end of said second lever of each toggle assembly on the top portion of said door assembly and constructed to permit movement of said second lever along its longitudinal axis; and
  spring bias means to provide said sufficient force on said first lever through said second lever to maintain said first lever in said first position during movement of said door assembly to its closed position by said power cylinder through said first lever,
said toggle assembly being in one overcenter condition when said first lever is at its first position and being at a second overcenter condition when said first lever is at its said second position, said overcenter conditions being on the opposite sides of the plane passing through the three pivotal axes of said toggle assembly when they are in alignment.

18. The hopper vehicle of claim 17 wherein:
said means pivotally mounting said other end of said second lever while permitting movement of said second lever along its axis comprises:
  a pair of space plates that extend inwardly from said door assembly and that have aligned slots extending from their edges in an upwardly inclined manner toward said door assembly; and
  a spring retainer block having a central opening and having trunions at its ends mounted in said slots;
said second lever has a clevis construction at its said one end for pivotally connecting said second lever to said first lever and said second lever is constructed generally for the rest of its length in the form of a cylindrical rod extending through said central opening of said spring retainer block; and
said spring bias means on said second lever is mounted on said cylindrical rod portion of said second lever between and abutting said spring retainer block and said clevis construction of said second lever.

19. The hopper vehicle of claim 15 and further including:
  a pair of locking means mounted on said supporting structure adjacent the ends of the bottom margin of each door assembly;
  a connecting stub tube mounted on the bottom margin of each door assembly for rotatable movement about a horizontal axis, said first lever being fixedly mounted on said stub tube for pivotal mounting of said first lever on the bottom margin of said door assembly;
  a pair of torsion bars fixedly mounted on the ends of each of said connecting stub tubes for rotation with it and extending toward the ends of said door assembly, said other end of each said torsion bar having fixedly mounted on it an arm constructed at its free end to constitute a latching lug, said arms being located at the transverse plane of said pair of locking means, adjacent the ends of the bottom margin of said door assembly, to provide a locking of said door assembly adjacent the ends with the locking of the door assembly by locking of said latching lug extension of said first lever with said locking means mounted on supporting structure in alignment with said lever.

20. The hopper vehicle of claim 15 wherein said inverted V-shaped panel extending from said one sloping end sheet terminates and is connected to the nearer of said side walls of said shield means and said hopper vehicle further includes a second inverted V-shaped panel extending from the other of said sloping end sheets and terminating and connected to the other of said side walls.

21. The hopper vehicle of claim 20 and further including a pair of slope sheets mounted on said supporting structure between said side walls of said shield means, said pair of slope sheets being located on opposite sides of said support means and each extending to a position that is closely adjacent said door assembly, and each of said locking means in alignment with said levers being mounted on one of said pair of slope sheets.

22. The hopper vehicle of claim 15 as a freight hopper car wherein:
said supporting structure includes:
  bolster assemblies adjacent the ends of the car to mount the car on truck assemblies;
  a center sill extending from about one end of the car to about the other end of the car and mounted adjacent its ends on said bolster assemblies; and
  a pair of lower stub side sills at each end of the car and mounted on said bolster assemblies;
said end walls include sloping end sheets;
said side walls include a panel for each side having its top portion extending from one end of the car to the other end and having an intermediate bottom cut-out portion;
said body structure of said car further includes:
  a top chord for each side of the car extending the full length of the car body, said sloping end sheets extending from transverse planes passing through the ends of said top chords downwardly to the bottom of said intermediate bottom cut-out portion of said panel;
  an upper intermediate side sill for each side of the car and connected to said side panel at its margin above the intermediate cut-out portion and having its end portions extending beyond said cut-out portion of said side panel so that each of the end portions of said upper intermediate side sill overlies a portion of one of said lower stub side sills, said upper intermediate side sills being located at a horizontal plane spaced about the horizontal plane passing through said lower stub side sills;

a pair of lower shear-resistant panels on each side of said car connected at their top margins to an end of said upper intermediate side sill and at their lower margins to one of said lower stub side sills; and a pair of upper shear-resistant panels on each side of said car connected at their top margins to said top chords and at their bottom margins to said end portions of said upper intermediate side sill; and said pair of door assemblies being hingedly mounted on said upper intermediate side sills at said intermediate bottom cut-out portion of said side panel.

23. The hopper vehicle of claim 1 and further including:

torsion linkage rotatably mounted on the bottom margin of each of said door assemblies, each of said torsion linkages including bars extending toward the ends of said door assembly at its bottom margin and said lever being fixedly mounted on said torsion linkage intermediate its length;

latching arms fixedly mounted on the ends of said bars adjacent the ends of said door assembly; and a pair of locking means mounted on said supporting structure adjacent the ends of the bottom margin of each door assembly and in alignment with said latching arms mounted on said rods of said torsion linkage, whereby said latching arms engage said pair of locking means when said door assembly is closed and said lever is in said second position with its latching extension engaging said locking means in alignment with said lever and whereby said latching arms are positioned to clear said pair of locking means when said lever is maintained at said first position during the closing of said door assembly so that said latching arms can be moved thereafter into locking position with said lever for a three-point locking of said door assembly.

24. The hopper vehicle of claim 1 and further including:

a pair of locking means mounted on said supporting structure adjacent the ends of the bottom margin of each door assembly;

a connecting stub tube mounted on the bottom margin of each door assembly for rotatable movement about a horizontal axis, said first lever being fixedly mounted on said stub tube for pivotal mounting of said first lever on the bottom margin of said door assembly;

a pair of torsion bars fixedly mounted on the ends of each of said connecting stub tubes for rotation with it and extending toward the ends of said door assembly, said other end of each said torsion bar having fixedly mounted on it an arm constructed at its free end to constitute a latching lug, said arms being located at the transverse plane of said pair of locking means, adjacent the ends of the bottom margin of said door assembly, to provide a locking of said door assembly adjacent the ends with the locking of the door assembly by locking of said latching lug extension of said first lever with said locking means mounted on supporting structure in alignment with said lever.

25. A freight hopper car having a pair of bottom hoppers extending lengthwise of the car on opposite sides of the vertical central plane of the car, which comprises:

a supporting structure including:

bolster assemblies adjacent the ends of the car to mount the car on truck assemblies;

a center sill extending from about one end of the car to about the other end of the car and mounted adjacent its ends on said bolster assemblies; and a pair of lower stub side sills at each end of the car and mounted on said bolster assemblies; and a body structure of said car including:

a top chord for each side of the car extending the full length of the car body;

sloping end sheets extending from transverse planes passing through the ends of said top chords downwardly toward an intermediate portion of said car;

a panel for each side having its top portion extending from one end of the car to the other end and having an intermediate bottom cut-out portion;

an upper intermediate side sill for each side of the car and connected to said side panel at its margin above the intermediate cut-out portion and having its end portions extending beyond said cut-out portion of said side panel so that each of the end portions of said upper intermediate side sill overlies a portion of one of said lower stub side sills, said upper intermediate side sills being located at a horizontal plane spaced about the horizontal plane passing through said lower stub side sills;

a pair of lower shear-resistant panels on each side of said car connected at their top margins to an end of said upper intermediate side sill and at their lower margins to one of said lower stub side sills;

a pair of upper shear-resistant panels on each side of said car connected at their top margins to said top chords and at their bottom margins to said end portions of said upper intermediate side sill;

an inverted generally V-shaped panel mounted on said center sill and extending lengthwise of the car and providing a part of said hoppers; and a pair of door assemblies hingedly mounted on said upper intermediate side sills at said intermediate bottom cut-out portion of said side panels and each constructed to provide by its upper portion a lower part of that side of the car at that cut-out portion and to provide by its lower portion the balance of one of said two hoppers of the car.

26. The freight hopper car of claim 25 wherein:

said inverted V-shaped panel extends from one of said sloping end sheets;

said pair of doors extend the length of said intermediate bottom cut-out portions of said side panels so that said door assemblies provide one side of two hoppers that extend the length of the car from said one sloping end sheet, and further including:

door-operating mechanism for each of said door assemblies and located intermediate the length of the door assembly, each of said door-operating mechanisms including:
a lever pivotally mounted at its bottom end on the bottom margin of said door assembly and having an inwardly directed extension that is constructed to function as a latching lug, said lever being movable between a first position abutting the inside of said door assembly when the door is unlocked and a second position spaced from the inside of said door assembly when the door is closed with said extension in its latching position to lock the closed door assembly;
power means mounted on said support means and operatively connected to said lever to provide a force in one direction for movement of said lever from said second position to said first position and to provide a force in the opposite direction on said lever for return movement of said door assembly to its closed position and subsequent movement of said lever from said first position to said second position; and means operatively connected to said lever to provide against said lever, when in its first position, a sufficient force to prevent movement of said lever from said first position when said power means provides a force in said opposite direction greater than the force of gravity acting on door assembly for movement of said door assembly to its closed position;
locking means mounted on said supporting structure in alignment with each of said levers to be engaged by said latching lugs provided by said extensions of said levers after said door assemblies are closed and said levers have been moved to their second positions;
shield means mounted on said supporting structure and extending between the two sides of the vehicle to cover said door-operating mechanisms and having a roof above said door-operating mechanisms and having spaced side walls on opposite sides of said door-operating mechanisms and extending downwardly from said roof to said two hoppers, one of said side walls being connected to the inner end of said inverted V-shaped panel; and
a second inverted V-shaped panel mounted on said center sill and extending lengthwise of the car from the other of said sloping end sheets and connected to the other side wall of said shield means,
said locking means and said latching lugs being constructed so that when each of said levers is in its said first position and the door assembly on which it is mounted is being moved to said closed position said latching lug clears said locking means with which it is engaged when said lever is moved to its second position after the door is closed.

27. The freight hopper car of claim 26 wherein each of said door assemblies includes:
a door panel;
a horizontal upper chord mounted on said door panel; and
a horizontal chord mounted on the bottom margin of said door panel to inhibit, in cooperation with said upper chord, torsional deflection of said door assembly and to provide a rigid bottom edge sealing surface for said door assembly,
and wherein said lever is pivotally mounted on said bottom chord.

28. The freight hopper car of claim 27 and further including for each side of said car:
a pair of locking lugs mounted on said supporting structure adjacent the ends of the bottom margin of each door assembly;
a connecting stub tube supported by and within said bottom chord of said door assembly for rotatable movement about a horizontal axis, said first lever being fixedly mounted on said stub tube for pivotal mounting of said first lever on the bottom margin of said door assembly;
a pair of torsion bars fixedly mounted on the ends of each of said connecting stub tubes for rotation with it and extending through and rotatably supported by said bottom chord toward the ends of said door assembly, said other end of each said torsion bar having fixedly mounted on it an arm constructed at its free end to constitute a latching lug, said arms being located at the transverse plane of said pair of locking means, adjacent the ends of the bottom margin of said door assembly, to provide a locking of said door assembly adjacent the ends with the locking of the door assembly by locking of said latching lug extension of said first lever with said locking means mounted on said supporting structure in alignment with said first lever.

29. The freight hopper car of claim 28 wherein:
each of said power means includes a power cylinder and a piston rod, one of these being pivotally mounted on said support means about an axis parallel to the longitudinal axis of the vehicle and the other of these being operatively connected to said lever; and
each of said means operatively connected to said lever to provide a sufficient force against said lever to maintain it in said first position during movement of said door assembly to its closed position comprises:
a second lever pivotally connected at one end to the top portion of said first lever to constitute, with said first lever, a toggle assembly;
means pivotally mounting the other end of said second lever of each toggle assembly on the top portion of said door assembly and constructed to permit movement of said second lever along its longitudinal axis; and
spring bias means to provide said sufficient force on said first lever through said second lever to maintain said first lever in said first position during movement of said door assembly to its closed position by said power cylinder through said first lever,
said toggle assembly being in one overcenter condition when said first lever is at its first position and being at a second overcenter condition when said first lever is at its said second position, said overcenter conditions being on the opposite sides of the plane passing through the three pivotal axes of said toggle assembly when they are in alignment.

30. The freight hopper car of claim 29 wherein:
said means pivotally mounting said other end of said second lever while permitting movement of said second lever along its axis comprises:
a pair of space plates that extend inwardly from said door assembly and that have aligned slots extending from their edges in an upwardly inclined manner toward said door assembly; and a spring retainer block having a central opening and having trunions at its ends mounted in said slots;

said second lever has a clevis construction at its said one end for pivotally connecting said second lever to said first lever and said second lever is constructed generally for the rest of its length in the form of a cylindrical rod extending through said central opening of said spring retainer block; and said spring bias means on said second lever is mounted on said cylindrical rod portion of said second lever between and abutting said spring retainer block and said clevis construction of said second lever.

31. The freight hopper car of claim 30 wherein:

each door assembly has an opening in alignment with a top portion of said lever of said door-operating mechanism for that door assembly; and each of said levers has its top portion an angular extension that is directed toward that opening in said door assembly so that said extension and thereby said lever can be grasped from outside said door assembly, when it is closed and locked, for the purpose of moving said lever from said second position to unlock said door assembly by disengaging said latching lug of said lever from said locking means.

32. The freight hopper car of claim 31 wherein said angular extension of said lever extends through said opening in said door assembly when said lever is in its said second position.

* * * * *